United States Patent [19]
Bunker et al.

[11] 3,746,045
[45] July 17, 1973

[54] SERVO VALVES

[75] Inventors: Kenneth James Bunker, Bedfordshire; Martin Ronald Wright, Hertfordshire, both of Great Britain

[73] Assignee: Alford & Alder (Engineers) Limited, Hertfordshire, England

[22] Filed: May 14, 1971

[21] Appl. No.: 143,395

[30] Foreign Application Priority Data

May 18, 1970 Great Britain .................24017/70

[52] U.S. Cl. ......................... 137/625.24, 91/375 A
[51] Int. Cl. ............................................ F16k 11/06
[58] Field of Search .......................... 251/281, 283; 91/368, 375, 375 A; 137/625.21, 625.22, 625.23, 625.24

[56] References Cited
UNITED STATES PATENTS 3,191,629  6/1965  Stoyke ........................... 137/625.23
3,359,866  12/1967  Folkerts ........................... 91/375 A Primary Examiner—Henry T. Klinksiek
Attorney—Stowell and Stowell and Thomas J. Greer, Jr.

[57] ABSTRACT

The servo valve for a power steering mechanism is described in which the valve comprises a rotor connected to a sleeve of a torsion valve, ports being provided in the rotor and sleeve to supply hydraulic fluid under pressure to a steering ram, the arrangement of the ports being such that there is a resultant radial force, caused by the hydraulic pressure, which inhibits radial oscillation of the rotor relative to the sleeve.

6 Claims, 5 Drawing Figures

SERVO VALVES

This invention relates to servo valves, and also to power-assisted steering in vehicles, incorporating such valves.

More particularly the invention is concerned with valves for controlling fluid operated servo-motors in power assisted steering mechanisms and of the kind in which two valve members are arranged for relative angular movement about a common axis to vary the supply of pressure fluid to the motor, the two members being inter-connected by a resilient element (e.g., a torque rod) resiliently resisting such movement and the two members being connected one to a steering control and the other to the wheel or wheels to be steered whereby steering torque applied by the control is transmitted to the wheels through the resilient element and the two valve members are relatively rotated by amounts proportional to the applied torque. The valve may be, and usually is, arranged to control the supply of pressure fluid at opposite ends of a double acting ram acting on the motor or to forward and reverse inlets of a rotatable motor and the two members may have cooperating ports and lands which, in a neutral position of the valve, apply equal fluid pressures (or volumes) to the opposite ends of the ram or to the two inlets and change the relative pressures (or volumes) on application of torque in either direction.

According to the present invention a servo valve of the kind in which:

a. a first valve member is connected to a second valve member by a resilient element which can twist to allow relative angular movement between the two members which movement is proportional to the applied torque; and b. relative angular movement of the two members is used to control, via ports in the two members, the supply of pressurised hydraulic fluid to one of two outlets of the valve depending upon the direction of rotation of the first member relatively to the second member; is characterised in that:

c. the ports are arranged so that in operation, i.e., when fluid is passing through the valve, there is a resultant radial pressure applied to the first member with respect to the second member which resultant pressure tends to urge the first member against the latter in order to prevent vibrations of the first member with respect to the second member.

The invention provides various improvement in valves of the above kind. These improvements which include a simplified arrangement of ports and lands, means for reducing the effect of friction or out-of-balance pressures on the members, and an arrangement of a rotatable motor which drives the steering through a reduction gear, are embodimed in specific form, in some specific construction which will now be described with with reference to the accompanying drawings in which.

Figure 1:
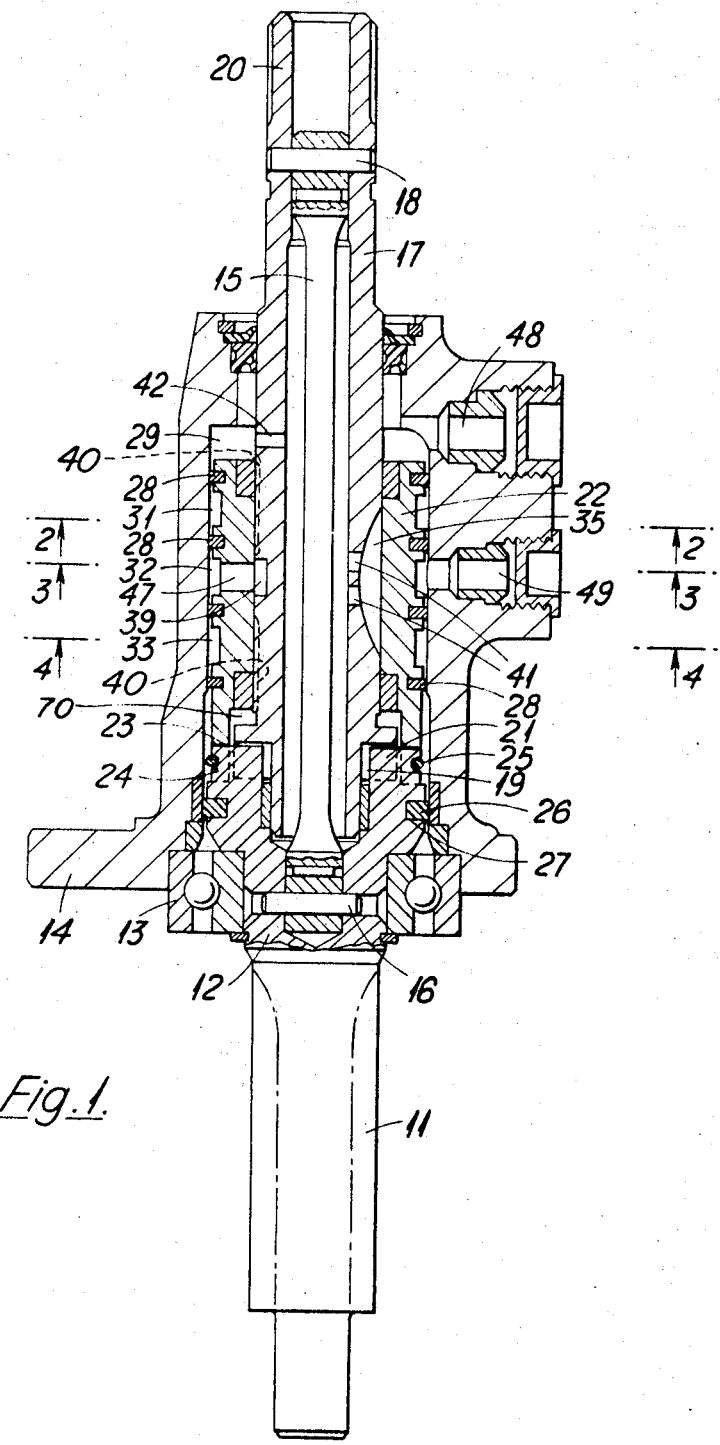
FIG. 1 is a longitudinal section through a servo valve for a hydraulic power-assisted vehicle steering system.

Referring to FIGS. 1 to 4, a motor-car steering system comprises a pinion 11 engageable with a rack (not shown), such that rotation of the pinion 11 moves the rack to steer the car. The pinion 11 is formed with base 12, which is located in, and supported by, a ball-bearing 13 in a housing 14. A torsion bar 15 is secured at its lower end to the base 12 by pin 16. The upper end of the torsion bar 15 is secured to a first member, hereinafter referred to as a rotor 17, by pin 18, and this end of the rotor has a splined head 20 for connection to the steering column of the vehicle. At its lower end the rotor 17 is formed with two recesses 19 which fit over two projections 21 on the base 12. The recesses 19 are larger than the projections 21, so that a limited amount of relative rotation twisting the torsion bar 15, is possible between the rotor 17 and the base 12 before the sides of the recesses engage the projections. This cooperation of the recesses 19 with the projections 21 serves to prevent overstraining of the torsion bar 15 and, if the torsion bar should break, provides a positive connection between the rotor 17 and the base 12.

A second member, hereinafter referred to as a sleeve 22, surrounds the rotor 17 and fits inside the housing 14. The sleeve is provided with recesses 23 at its lower end which are a close fit over the projections 21, thus precluding relative rotation of the sleeve 22 and the base 12. An annular notch 24 is formed around the sleeve 22 and the projections 21, and a clip 25 fits in the notch to hold the sleeve 22 and the base 12 together. A nitrile rubber seal 26, which is preferably spray-coated with polytetrafluoroethylene (PTFE), seats in a groove 27 in the base and seals against the housing 14. Four seals 28 fit into grooves in the sleeve 22 and seal against the housing, separating four annular channels 29, 31, 32 and 33 from each other.

The rotor 17 is formed with three axially extending slots 34, 35 and 36, separated by two lands 37 and 38. A channel 39 extends around the circumference of the rotor, linking the outer slots 34 and 36, and two ports 41 extend from the central slot 35 to the annular space between the rotor 17 and the torsion bar 15. Six equi-spaced ports 42 in the rotor connect this space to the channel 29. The rotor is also formed with two axially extending flats 40, which extend from peripheral passageways 29, 70 at the ends of the rotor over most of the length of the rotor (except for a portion either side of the channel 39, so as to avoid leakage).

The sleeve 22 is formed with two axially extending slots 43, 44 which, in the neutral position of the valve, are located symmetrically with respect to the lands 37 and 38 and opposite thereto. The slot 43 is connected to the channel 31 by a port 45, and the slot 44 is connected to the channel 33 by a port 46. A port 47 links the channel 32 with the channel 39 in the rotor.

The housing 14 has two ports 48, 49 and two others (not shown). Each port is associated with one of the channels 29, 31 and 33, so that the port 48 connects the channel 29 to the sump of the hydraulic power-assistance system, the port 49 connects the channel 32 to the output of the pump of the system, and the other two ports connect the channels 31 and 33 to the cylinder of a hydraulic jack for the steering assembly.

Figure 2:
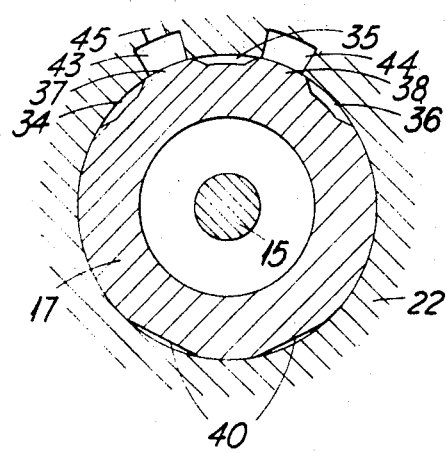
FIG. 2 is a section on the line 2—2 in FIG. 1.
Figure 3:
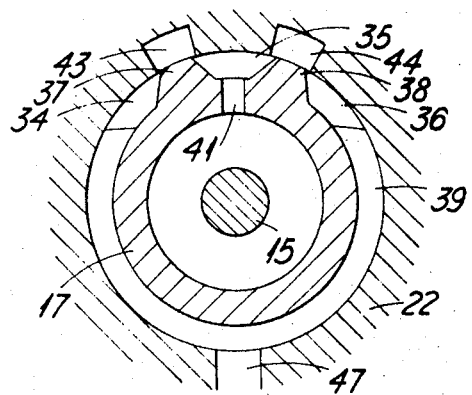
FIG. 3 is a section on the line 3—3 in FIG. 1.
Figure 4:
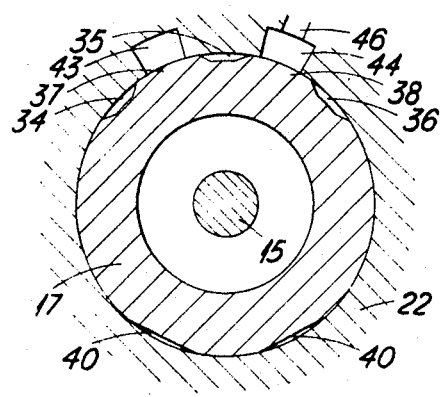
FIG. 4 is a section on the line 4—4 in FIG. 1.

The operation of the valve is basically similar to that of known valves, and in the neutral position hydraulic fluid enters the valve by the port 49, passes into the channel 39 via the channel 32 and port 47, and passes, in equal amounts on either side, to the slot 35 via the slots 34 and 43 on one side and 36 and 44 on the other side. From the channel 35 it passes to the exhaust port 48 via the ports 41 and 42 and the channel 29. When steering torque is applied to the rotor 17 the rotor twists relative to the sleeve 22, and the cooperating slots and lands control the hydraulic fluid to give power assistance. If, for instance, the rotor moves clockwise relative to the sleeve (as seen in FIGS. 2, 3 and 4), the land 37 moving relative to the slot 43 restricts flow from the slot 43 to the exhaust slot 35, while allowing more flow from the channel 39 to enter the slot 43 and pass, through the port 45, to the steering jack. Simultaneously, the relative motion of the land 38 and the slot 44 restricts the flow into the slot 44 while allowing more flow from the slot to the exhaust slot 35, thus enabling fluid to be displaced from the other side of the steering jack.

Hitherto, it has been usual to make servo valves as symmetrical units with at least two sets of control slots and lands, so that the radial forces on the rotor due to the pressure unbalances cancel out and the tendency for the rotor to rub on the sleeve and stick is obviated. However, this makes the units expensive, as two or more sets of control slots and lands must be accurately made and accurately spaced from each other. It is unlikely that perfect symmetry will be achieved in production, so that means have been provided for trimming the unit in use to give a zero output at zero torque. Furthermore because of the equalisation of these radical forces there is an undesirable tendency for the rotor to oscillate radially with respect to the sleeve and cause a "chattering" or "grunting" noise in use. With the valve of the present invention the pressure around the circumference of the rotor 17 is not uniform, so that a net force is exerted on it which prevents the "chattering" or "grunting" referred to. It has been found, moveover that a unit can be constructed using only one set of control slots and lands, as in the embodiment described, which will not stick. This is achieved by grinding flats 40 on the surface of the rotor at certain points so that the binding between the rotor and the sleeve due to the pressure imbalance is reduced to insignificant proportions as a result of fluid pressure contained by the flats and acting radially against the pressure of the slots 34, 35 and 36 and lands 37, 38. Further, less error due to accumulation of tolerances is involved in the manufacture of such a unit and it is not necessary to incorporate an adjuster (which has often been a source of trouble in previous units). It is merely necessary to mount the unit in a test rig before insertion of the pin 18, rotate the rotor 17 so as to determine the positions giving a pressure at the steering jack of, say, 300 lbs/in$^2$, in each direction, and then drill holes in the rotor and the torsion bar 15 for insertion of the pin 18 in such a position as to hold the rotor midway between these two positions.

It is also possible, in a modification, to set the unit in the neutral position after it has been assembled to a vehicle. For convenience, the torsion bar and sleeve may be screw-threaded, so as to hold them together during assembly. It would be possible, in this form, to lock the unit in the neutral position by a lock-nut on the end of the threaded torsion bar.

Figure 5:
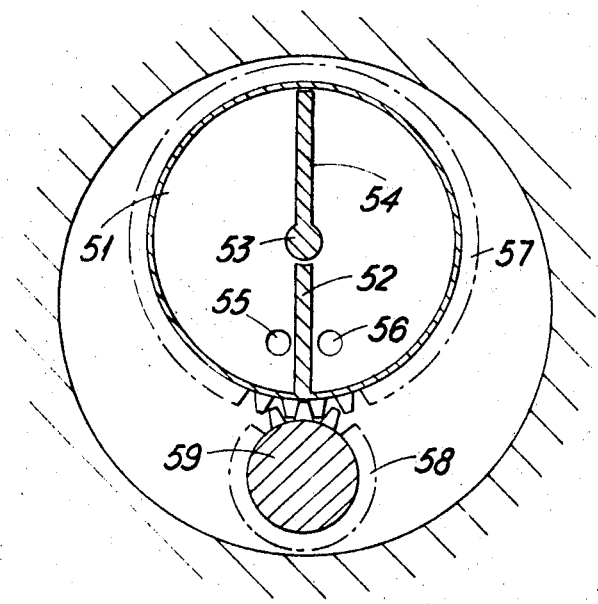
FIG. 5 is a sectional view of a hydraulic power-assisted steering system.

Referring now to FIG. 5, there is shown part of a power-assisted steering apparatus utilising a hydraulic vane-type actuator. The unit can be used instead of the double-acting hydraulic jack of previous systems, and is controlled by a servo valve, as described above and located in the steering column between the control wheel and the actuator drive. A cylinder 51 contains a radially extending wall member 52 which is secured to the wall and the two ends of the cylinder. A shaft 53 extending along the axis of the cylinder carries a vane 54. Ports 55, 56 are connected to the servo valve controlling power-assistance, and it will be clear that a pressure increase on either side of the vane 54 will cause rotation of the shaft 53. The shaft is secured to a gearwheel 57, which meshes with a gear-wheel 58 on the steering column 59 of the vehicle, so that movement of the vane 54 results in rotation of the steering column 59.

This apparatus drives the steering column of the vehicle through reduction gearing, whereas conventional systems drive the track-rod or a similar part direct. It will therefore be clear that the present apparatus is working through a mechanical advantage, and may be lightly built; it would even be possible to use plastics materials rather than metals. Further, the unit can be made very compact, so that it could be applied to smaller vehicles than has hitherto been possible with power assisted steering.

We claim:
1. A servo valve of the kind in which:
   a. a first valve member is connected to a second valve member by a resilient element which can twist to allow relative angular movement between the two members which movement is proportional to the applied torque; and
   b. relative angular movement of the two members is used to control, via ports in the two members, the supply of pressurised hdraulic fluid to one of two outlets of the valve depending upon the direction of rotation of the first member relatively to the second member; is characterised in that;
   c. the ports are arranged so that in operation, i.e., when fluid is passing through the valve, there is a resultant radial pressure applied to the first member with respect to the second member which resultant pressure tends to urge the first member against the latter in order to prevent vibrations of the first member with respect to the second member.

2. A servo valve as claimed in claim 1 characterised in that a single set of ports is formed in one circumferential region of the first and second members and one or more flats is or are formed on the first member at a diametrically opposite region to contain hydraulic fluid the pressure of which will oppose that contained in or passing through the said ports to reduce the magnitude of the said resultant radial pressure.

3. A servo valve as claimed in claim 1 in which the first member comprises a rotor which is rotatable within the second member which comprises a sleeve, the port arrangements being as follows:
   a. the rotor has a first slot, which is connected to the exhaust of the valve and through which fluid is supplied from the inlet to the valve;
   b. two lands of the rotor on each side of the first slot are in register with two ports in the sleeve when there is no torque reaction between the rotor and the sleeve to allow equal amounts of fluid to pass through said ports to exhaust;
   c. second and thrid slots on opposite sides of the said lands to the first slot allow fluid to pass from a supply port in the sleeve to either one of the two ports to the mutual exclusion of the remaining port which is simultaneously brought into communication with the first slot to exhaust the latter; and d. substantially diametrically opposite the aforesaid arrangement of ports and slots is or one or more flats formed on the circumference of the rotor so that hydraulic fluid contained by the flats exerts a radial pressure on the rotor which opposes that exerted by the fluid in the aforesaid slots and ports.

4. A servo valve which has the following features:

a. a rotor is rotatable within a sleeve which in turn is contained within a housing;

b. the rotor is connected to the sleeve by a torsion bar so that rotation of the rotor will be transmitted to the sleeve by the torsion bar, and the torsion bar will allow the rotor to rotate relatively to the sleeve if a load is applied to the sleeve;

c. the housing has a fluid inlet, a fluid exhaust and two fluid outlets;

d. the rotor has three axially extending slots separated by two axially extending lands located at a first region of the periphery of the rotor, the middle slot being in communication with the exhaust of the valve;

e. the sleeve has two ports which are in communication with the two outlets respectively and which are closed by the two lands when there is no torque reaction between the rotor and the sleeve but rotation of the rotor relatively to the sleeve results in the lands moving out of register with their associated ports to bring one of the latter into communication with the inlet of the valve and the other into communication with the exhaust of the valve; and f. one or more flats are formed on the rotor in a region substantially diametrically opposite the said first region so that hydraulic fluid contained by the slot or slots exerts a radial pressure on the rotor which opposes the radial pressure exerted by the fluid in the same slots and ports.

5. A servo valve which has the following features:

a. a first valve member is connected to a second valve member by a resilient element which can twist to allow relative angular movement between the two members which movement is proportional to the applied torque;

b. relative angular movement of the two members is used to control, via ports in the two members, the supply of pressurized hydraulic fluid to one of two outlets of the valve depending upon the direction of rotation of the first member relative to the second member;

c. a single set of ports is formed in one circumferential region of the first and second valve members and one or more flats is or are formed on the first valve member at a diametrically opposite region to said set of ports in order to contain hydraulic fluid , the pressure of which will oppose that contained in or passing through the said ports.

6. A servo valve which has the following features:

a. a rotor which is rotatable within a sleeve;

b. a torsion bar connecting the rotor to the sleeve whereby rotation of the rotor can be transmitted to the sleeve;

c. a first slot formed in the rotor through which fluid is adapted to be supplied through an inlet to the valve;

d. two lands formed on the rotor on each side of the said first slot, the two said lands being in register with two ports in the sleeve when there is no torque reaction between the rotor and the sleeve to allow equal amounts of fluid to pass through said ports to exhaust;

e. second and third slots formed on opposite sides of the said lands to the first slots, said second and third slots being adapted to allow fluid to pass from the supply port in the sleeve to either one of the two said ports to the mutual exclusion of the remaining port, the latter being simultaneously brought into communication with the first slot to exhaust the latter;

f. one or more flats formed on the circumference of the rotor at points diametrically opposite the aforesaid arrangement of ports and slots; and g. means for supplying fluid to said flats to thus exert a radial pressure on the rotor which opposes that exerted by the fluid in the aforesaid slots or ports.

* * * * *